(12) United States Patent
Wang et al.

(10) Patent No.: US 12,738,581 B2
(45) Date of Patent: Sep. 15, 2026

(54) BATTERY CELL, BATTERY, POWER CONSUMPTION DEVICE, AND MANUFACTURING METHOD FOR BATTERY CELL

(71) Applicant: CONTEMPORARY AMPEREX TECHNOLOGY (HONG KONG) LIMITED, Hong Kong (CN)

(72) Inventors: Manman Wang, Ningde (CN); Yulei Fan, Ningde (CN); Xiaoming Ge, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 435 days.

(21) Appl. No.: 18/582,649

(22) Filed: Feb. 21, 2024

(65) Prior Publication Data

US 2024/0194996 A1 Jun. 13, 2024

Related U.S. Application Data

(63) Continuation of application No. PCT/CN2021/115701, filed on Aug. 31, 2021.

(51) Int. Cl.
*H01M 50/24* (2021.01)
*H01M 50/227* (2021.01)
(Continued)

(52) U.S. Cl.
CPC ......... *H01M 50/24* (2021.01); *H01M 50/227* (2021.01); *H01M 50/249* (2021.01); *H01M 50/394* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 7,147,952 | B1 | 12/2006 | Huang | |
| 2013/0208405 | A1* | 8/2013 | Okada | H01M 50/383 361/521 |
| 2019/0198908 | A1 | 6/2019 | Lee et al. | |

FOREIGN PATENT DOCUMENTS

| | | | |
|---|---|---|---|
| CN | 203895528 | U | 10/2014 |
| CN | 109273778 | B | 1/2019 |

(Continued)

OTHER PUBLICATIONS

International Search Report received in the corresponding International Application PCT/CN2021/115701, mailed Nov. 30, 2021.

(Continued)

*Primary Examiner* — Wyatt P McConnell
(74) *Attorney, Agent, or Firm* — K&L Gates LLP

(57) ABSTRACT

Provided are a battery cell, a battery, a power consumption device, and a manufacturing method for a battery cell. The battery cell includes a housing, a protective member, a cell, an elastic member, a first gas-permeable component and a second gas-permeable component. The protective member is mounted on an inner wall of the housing and separates an inner space of the housing into a first chamber and a second chamber, the cell is disposed in the first chamber, the elastic member is disposed in the second chamber and located between the housing and the protective member, the protective member is configured such that the elastic member is compressed with expansion of the cell and stretched with contraction of the cell.

15 Claims, 4 Drawing Sheets

(51) Int. Cl.

| | |
|---|---|
| ***H01M 50/249*** | (2021.01) |
| ***H01M 50/30*** | (2021.01) |

(56) References Cited

FOREIGN PATENT DOCUMENTS

| | | | |
|---|---|---|---|
| CN | 208955137 | U | 6/2019 |
| CN | 110021727 | A | 7/2019 |
| CN | 209592214 | U | 11/2019 |
| CN | 210692700 | U | 6/2020 |
| CN | 212848671 | U | 3/2021 |
| CN | 112803520 | A | 5/2021 |
| EP | 2410592 | A1 | 1/2012 |

OTHER PUBLICATIONS

Written Opinion of ISA received in the corresponding International Application PCT/CN2021/115701, mailed Nov. 30, 2021.

The extended European search report received in the corresponding European Application 21860576.4, mailed on Sep. 3, 2024.

* cited by examiner

BATTERY CELL, BATTERY, POWER CONSUMPTION DEVICE, AND MANUFACTURING METHOD FOR BATTERY CELL

CROSS-REFERENCE TO RELATED APPLICATIONS

This application is a continuation of International Application PCT/CN2021/115701, filed Aug. 31, 2021 and entitled "BATTERY CELL, BATTERY, POWER CONSUMPTION DEVICE, AND MANUFACTURING METHOD FOR BATTERY CELL", which is incorporated herein by reference in its entirety.

TECHNICAL FIELD

The present application relates to the technical field of batteries, and in particular, to a battery cell, a battery, a power consumption device, and a manufacturing method for a battery cell.

BACKGROUND

Energy conservation and emission reduction are the key to the sustainable development of the automotive industry. Electric vehicles have become an important part of the sustainable development of the automotive industry due to their advantages of energy conservation and environmental protection. For the electric vehicles, the battery technology is an important factor for their development.

During the use of charging and discharging of a battery, a battery core expands and affects safety performance of the battery.

SUMMARY

The present application provides a battery cell, a battery, a power consumption device, and a manufacturing method for a battery cell, which could alleviate the problem that a battery core expands and affects safety performance of the battery.

In a first aspect, the present application provides a battery cell, which includes:

a housing;

a protective member mounted on an inner wall of the housing and separating an inner space of the housing into a first chamber and a second chamber;

a battery core disposed in the first chamber;

an elastic member disposed in the second chamber and located between the housing and the protective member, the protective member being configured such that the elastic member is compressed with expansion of the battery core and stretches with contraction of the battery core;

a first gas-permeable component mounted on the protective member and configured for one-way communication between the first chamber and the second chamber to enable gas in the first chamber to enter the second chamber through the first gas-permeable component; and a second gas-permeable component mounted on the housing and configured for one-way communication between the second chamber and an outer space of the housing to enable gas in the second chamber to be discharged out of the housing through the second gas-permeable component.

In a technical solution of an embodiment of the present application, a battery cell includes a housing, a protective member, a battery core, an elastic member, a first gas-permeable component and a second gas-permeable component. The protective member is mounted on an inner wall of the housing, and may separate an inner space of the housing into a first chamber and a second chamber. The battery core is disposed in the first chamber. The elastic member is disposed in the second chamber. The battery core may be isolated from the elastic member through the protective member, which can protect the battery core and prevent direct contact between the elastic member and the battery core so as not to cause damage to the battery core, and can protect the elastic member and prevent an electrolytic solution in the battery core from causing corrosion to the elastic member.

The protective member is configured such that the elastic member is compressed with expansion of the battery core and stretches with contraction of the battery core. When the battery core expands, the elastic member is compressed to absorb the pressure due to the expansion of the battery core, which avoids the increase in the overall volume of the housing and the deterioration of battery performance; and when the battery core contracts, the elastic member may stretch and recover to maintain the tight interface contact between electrode sheets inside the battery core, and the elastic member may also support the battery core to prevent the production of a gap between the housing and the battery core so as not to affect the stability of the battery core.

The gas generated by the battery core during working may be discharged from the first chamber to the second chamber in time through the first gas-permeable component, and the gas may be discharged from the second chamber to the outside of the housing through the second gas-permeable component, which prevents the gas from staying in the housing so as not to affect interfaces of the electrode sheets, the infiltration of the electrolytic solution on the electrode sheets, and the performance of the battery.

The elastic member and the gas-permeable components are also provided in the embodiment of the present application, which can not only meet the need of alleviating a change of the volume of the battery cell, but also absorb the swelling stress of the battery cell when the battery cell is charged and expands, and maintain the tight interface contact between a positive electrode sheet and a negative electrode sheet when the battery is discharged, so as to build a breathing battery working mode; and due to the existence of the first gas-permeable component and the second gas-permeable component, when the battery cell generates gas, the generated gas may be discharged to the outside of the battery cell in real time, thereby ensuring the stability of the performance of the battery cell.

In some embodiments, the protective member includes a flexible portion, and the flexible portion is capable of deforming with stretch and compression of the elastic member. Through the deformation of the flexible portion, the protective member may deform with stretch and compression of the elastic member, thereby allowing the elastic member to be compressed with expansion of the battery core or to recover to its original shape with contraction of the battery core.

In some embodiments, a material of the flexible portion includes at least one of nitrile rubber, silicon rubber, fluororesin and polypropylene. These materials may make the texture of the flexible portion relatively soft and easily deform, so as to achieve the purpose of deformation with stretch and compression of the elastic member.

In some embodiments, the battery cell further includes a baffle disposed in the second chamber, the baffle is disposed on an inner side of the flexible portion, and the elastic member is disposed between the baffle and the housing.

By providing the baffle and disposing the elastic member between the baffle and the housing, the generation of a large squeezing force by the elastic member on the electrode sheets in the battery core can be avoided so as not to cause the damage to the electrode sheets. By providing the baffle, the direct contact between the elastic member and the flexible portion can also be avoided, the sharp end of the elastic member prevented from puncturing the flexible portion, the flexible portion effectively protected, and the service life of the protective member improved.

In some embodiments, a material of the baffle includes terylene resin. This material can meet the hardness requirement, and the cost is relatively low.

In some embodiments, the protective member includes a first protective portion and a telescopic portion coupled between the first protective portion and the housing, the elastic member is disposed between the first protective portion and the housing, and the telescopic portion lengthens or shortens under an action of the elastic member.

Through the extension or shortening of the telescopic portion, the purpose of deformation of the protective member with stretch and compression of the elastic member can be realized, so that the elastic member may deform with the expansion or contraction of the battery core.

In some embodiments, the telescopic portion includes a telescopic ripple-like connecting portion. The ripple-like connecting portion has an ability to lengthen or shorten, and may stretch and be compressed with stretch and compression of the elastic member, so that the elastic member deforms with expansion or contraction of the battery core.

In some embodiments, the elastic member includes a spring, and a length of the spring ranges from 2 mm to 10 mm. If the spring is too long, the length of the housing will be increased, and the area occupied by the battery cell will be increased. If the spring is too short, it is possible to affect the stretch and compression ability of the spring and reduce the ability to alleviate the expansion of the battery core.

In some embodiments, the battery cell includes a plurality of elastic members, and the plurality of elastic members are evenly arranged in the second chamber in multiple rows.

By providing the plurality of elastic members, the ability to support the battery core can be improved, and the plurality of elastic members are evenly distributed, which can provide even support for the battery core and prevent the battery core from being partially squeezed and damaged.

In some embodiments, the first gas-permeable component includes a first one-way gas-permeable valve or a one-way gas-permeable membrane.

The one-way gas-permeable valve has high structural strength and a long service life. The arrangement of the one-way gas-permeable membrane is relatively convenient, and does not occupy too much space. The one-way gas-permeable membrane may allow gas to pass through, and may isolate a liquid, which prevents the electrolytic solution in the first chamber from entering the second chamber.

In some embodiments, the second gas-permeable component includes a second one-way gas-permeable valve. The second gas-permeable component is exposed on an outer surface of the housing, the second gas-permeable component adopts a gas-permeable valve, which has high structural strength, and the service life of the second gas-permeable component can be effectively improved.

In some embodiments, the battery cell further includes an explosion-proof valve disposed on the housing, the first gas-permeable component includes a first one-way gas-permeable valve, and an opening pressure of the first one-way gas-permeable valve and an opening pressure of the second one-way air permeable valve are both less than an opening pressure of the explosion-proof valve. This setting can allow the first one-way air permeable valve and the second one-way air permeable valve to be opened before the explosion-proof valve is opened, which prevents the explosion-proof valve from being detonated before opening the first one-way air permeable valve and the second one-way air permeable valve, so as not to cause the housing to relieve the pressure in advance.

In a second aspect, the present application provides a battery, which includes the battery cell in the above embodiment.

In a third aspect, the present application provides a power consumption device, which includes the battery in the above embodiment.

In a fourth aspect, the present application provides a manufacturing method for a battery cell, which includes:

- providing a housing;
- mounting a protective member on an inner wall of the housing, the protective member separating an inner space of the housing into a first chamber and a second chamber;
- disposing a battery core in the first chamber;
- disposing an elastic member in the second chamber, the elastic member being located between the housing and the protective member, and the protective member being configured such that the elastic member is compressed with expansion of the battery core and stretches with contraction of the battery core;
- mounting a first gas-permeable component on the protective member, the first gas-permeable component being configured for one-way communication between the first chamber and the second chamber to enable gas in the first chamber to enter the second chamber; and
- mounting a second gas-permeable component on the housing, the second gas-permeable component being configured for one-way communication between the second chamber and an outer space of the housing to enable gas in the second chamber to be discharged out of the housing.

The above description is merely an overview of the technical solutions of the present application. In order to comprehend the technical means of the present application better, it can be implemented according to the contents of the specification, and in order to make the above and other purposes, features and advantages of the present application more obvious and comprehensible, the specific embodiments of the present application will be specifically provided hereinafter.

BRIEF DESCRIPTION OF THE DRAWINGS

In order to illustrate the technical solutions in the embodiments of the present application more clearly, brief description will be made below to the accompanying drawings required in the embodiments of the present application. Apparently, the accompanying drawings described below are some embodiments of the present application only, and other drawings could be obtained based on these accompanying drawings by those ordinary skilled in this art without creative efforts.

Figure 1:
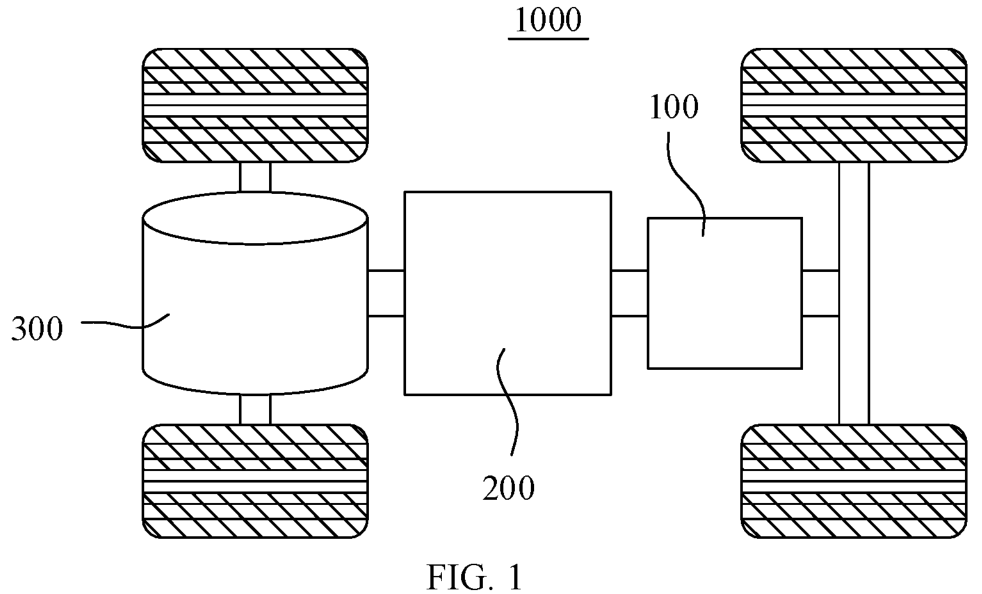
FIG. 1 is a schematic structural diagram of a power consumption device disclosed in some embodiments of the present application.

In the accompanying drawings, the accompanying drawings are not drawn to actual scale.

DESCRIPTION OF REFERENCE SIGNS

1000, vehicle; 100, battery; 200, controller; 300, motor;

10, box; 101, first cover body; 102, second cover body; 20, battery cell;

1, housing; 2, terminal; 3, second gas-permeable component; 4, protective member; 5, battery core; 6, elastic member; 7, first gas-permeable component; 8, tab; 9, baffler.

DESCRIPTION OF EMBODIMENTS

Embodiments of technical solutions of the present application will be described below in detail with reference to accompanying drawings. The following embodiments are intended only to illustrate the technical solutions of the present application more clearly and are therefore intended as examples only, and cannot be used to limit the protection scope of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the specification and the claims of the present application as well as the brief description of the drawings described above are intended to cover non-exclusive inclusions.

In the description of the embodiments of the present application, the technical terms such as "first" and "second" are merely used to distinguish different objects, and shall not be understood as an indication or implication of relative importance or implicit indication of the quantity of indicated technical features, a specific order or primary-secondary relationship. In addition, the term "vertical" is not strictly vertical, but within an allowable range of error. "Parallel" is not strictly parallel, but within an allowable range of error.

The phrase "embodiment" mentioned herein means that the specific features, structures, or characteristics described with reference to the embodiment may be included in at least one embodiment of the present application. The phrase at various locations in the specification does not necessarily refer to the same embodiment, or an independent or alternative embodiment that is mutually exclusive from another embodiment. Those skilled in the art understand, in explicit and implicit manners, that the embodiments described herein may be combined with another embodiment.

In the description of the embodiments of the present application, the term "and/or" is only an association relation describing associated objects, which means that there may be three relations. For example, A and/or B may represent three situations: A exists alone, both A and B exist, and B exists alone. In addition, the character "/" herein generally indicates that the associated objects before and after the character are in an "or" relationship.

In the description of the embodiments of the present application, the term "a plurality of" means two or more, unless otherwise explicitly and specifically defined. Similarly, "a plurality of groups" means two or more groups, and "a plurality of sheets" means two or more sheets, unless otherwise explicitly and specifically defined.

In the description of the embodiments of the present application, orientations or positional relationships indicated by the technical terms such as "center", "lengthwise", "crosswise", "length", "width", "thickness", "up", "down", "front", "rear", "left", "right", "vertical", "horizontal", "top", "bottom", "inside", "outside", "clockwise", "counter-clockwise", "axial direction", "radial direction" and "circumferential direction" are orientations or positional relationships shown based on the drawings, and the terms are merely for convenience of describing the embodiments of the present application and for simplifying the description, rather than for indicating or implying that an apparatus or element indicated must have a specific orientation, and must be constructed and operated in a specific orientation, which thus shall not be understood as limitation to the embodiments of present application.

In the description of the embodiments of the present application, unless otherwise explicitly specified and defined, the technical terms, such as "installation", "interconnection", "connection" and "fixing", should be understood in a broad sense; for example, they may be either a fixed connection, or a detachable connection, or an integrated connection; they may be a mechanical connection, or an electrical connection; and they may be a direct connection, or an indirect connection via an intermediate medium, or communication between interiors of two elements or the interactive relationship of two elements. Those of ordinary skill in the art may appreciate the specific meanings of the foregoing terms in the embodiments of the present application according to specific conditions.

At present, from the development of the market situation, the application of traction batteries becomes increasingly widespread. The traction batteries are not only applied to energy storage power systems, such as hydraulic power, thermal power, wind power and solar power plants, but widely applied to electric transport, such as electric bicycles, electric motorcycles, electric vehicles, as well as many fields, such as military equipment and aerospace. With the continuous expansion of the application fields of traction batteries, the market demand for the traction batteries is also constantly expanding.

The inventor of the present application noticed that as a positive active material and a negative active material intercalate and deintercalate ions during the charging-discharging cycle of a battery, a side reaction accumulation thickness of a battery core system, the peeling off of a layer of graphite sheet and the like cause the battery core to bulge, that is, a positive electrode sheet and a negative electrode sheet expand outward. The expansion of the electrode sheets has an adverse effect on the performance and service life of the battery. For example, the squeeze with a force may cause the reduction of the porosity of the electrode sheets, affect the infiltration of an electrolytic solution on the electrode sheets, cause a change of the transmission path of ions, and bring about the problem of lithium plating; and when subject to a large squeezing force for a long time, the electrode sheets may break to cause the risk of a short circuit in the battery and so on.

In order to alleviate the problem of the swelling force inside the battery, the applicant has found through research that a pressure buffering device may be disposed inside the battery to constitute a battery core with a breathing function. The swelling stress of the battery core can be absorbed through the pressure buffering device. When a negative electrode expands, the volume of the pressure buffering device contracts; and when the negative electrode contracts, the volume of the pressure buffering device recovers, which avoids a sudden change in the overall volume of the battery core, thereby ensuring stability of the performance of the battery.

The applicant has further researched and found that although the pressure buffering device may play a role of buffering the pressure to adapt to the effect of the volume change of the battery core due to contraction and expansion, for a lithium metal battery, if a three-dimensional metal foam material is adopted as the negative electrode and an electrolytic solution with serious gas production such as lithium bistrifluoromethanesulfonimidate is adopted, in addition to solving the problem of the volume change due to charging and discharging, it is necessary to face the problem of how to discharge gas generated during the chemical conversion and the battery use in time, otherwise the gas may affect the interfaces of the electrode sheets, thereby deteriorating the performance of the battery.

Based on the above considerations, in order to simultaneously solve the problems that the volume of the battery core may change during working and gas may be generated inside the battery and cannot be discharged in time, the inventor has conducted in-depth research and designed a battery cell, which is provided with both an elastic member and a gas-permeable component. When the volume of a battery core changes, the swelling stress of the battery core can be absorbed through the elastic member, which prevents a great sudden change in the volume of the battery core, so as not to affect the stability of the performance of the battery; and when gas is generated inside the battery, the gas can be discharged to the outside of the battery in time through the gas-permeable component, which avoids the gas to affect interfaces of electrode sheets, thereby not deteriorating the performance of the battery.

By providing the elastic member, when the volume of the battery core expands, the elastic member is compressed; and when the volume of the battery core contracts, the deformation of the elastic member recovers. Therefore, the stability of the overall volume of the battery can be maintained through the elastic member, which avoids a great change of the overall volume of the battery, so as not to affect the connection of other components inside the battery and the stability of the performance of the battery.

During the chemical conversion and the battery use, when the gas generated inside the battery makes the gas pressure inside the battery greater than the pressure outside the battery, the gas can be discharged to the outside of the battery in time through the gas-permeable component, which prevents the gas from affecting the interfaces of the electrode sheets, thereby not deteriorating the performance of the battery.

The battery cell disclosed in the embodiment of the present application may be used in, but not limited to, a power consumption device, such as a vehicle, a ship or an aerial vehicle. A power supply system having the power consumption device composed of the battery cell, the battery or the like disclosed in the present application can be used, which is conducive to alleviating and automatically adjusting the deterioration of the swelling force of the battery core, supplementing the consumption of the electrolytic solution, and improving the stability of the performance of the battery and the battery life.

An embodiment of the present application provides a power consumption device that uses a battery as a power source, and the battery is configured to provide electric energy for the power consumption device. The power consumption device may be, but is not limited to, a mobile phone, a portable device, a netbook computer, an electromobile, an electric vehicle, a ship, a spacecraft, an electric toy, an electric tool, and the like. For example, the spacecraft includes an airplane, a rocket, a space shuttle, a spaceship, and the like; the electric toy includes a fixed or mobile electric toy, such as a game console, an electric vehicle toy, an electric ship toy, and an electric airplane toy; and the electric tool includes an electric metal cutting tool, an electric grinding tool, an electric assembling tool and an electric railway tool, such as an electric drill, an electric grinder, an electric spanner, an electric screwdriver, an electric hammer, an electric impact drill, an concrete vibrator and an electric planer.

For convenience of description, the following embodiments will be explained by an example that a power consumption device according to an embodiment of the present application is a vehicle 1000.

With reference to FIG. 1, FIG. 1 is a schematic structural diagram of a vehicle 1000 provided in some embodiments of the present application. The vehicle 1000 may be a fuel-powered vehicle, a gas-powered vehicle or a new energy vehicle, and the new energy vehicle may be a battery electric vehicle, a hybrid vehicle, an extended-range vehicle, or the like. The vehicle 1000 may be internally provided with a battery 100, and the battery 100 may be disposed at the bottom, head or tail of the vehicle 1000. The battery 100 may be configured to supply power to the vehicle 1000. For example, the battery 100 may be used as an operation power source of the vehicle 1000. The vehicle 1000 may further include a controller 200 and a motor 300. The battery 100 is configured to provide electric energy for operation of the motor 300 and other components in the vehicle, and the controller 200 is configured to control the operation of the motor 300, for example, for a working power demand of the vehicle 1000 during startup, navigation and running.

In some embodiments of the present application, the battery 100 may be used not only as an operation power source of the vehicle 1000, but also as a driving power source of the vehicle 1000, replacing or partially replacing fuel or natural gas to provide driving power for the vehicle 1000.

Figure 2:
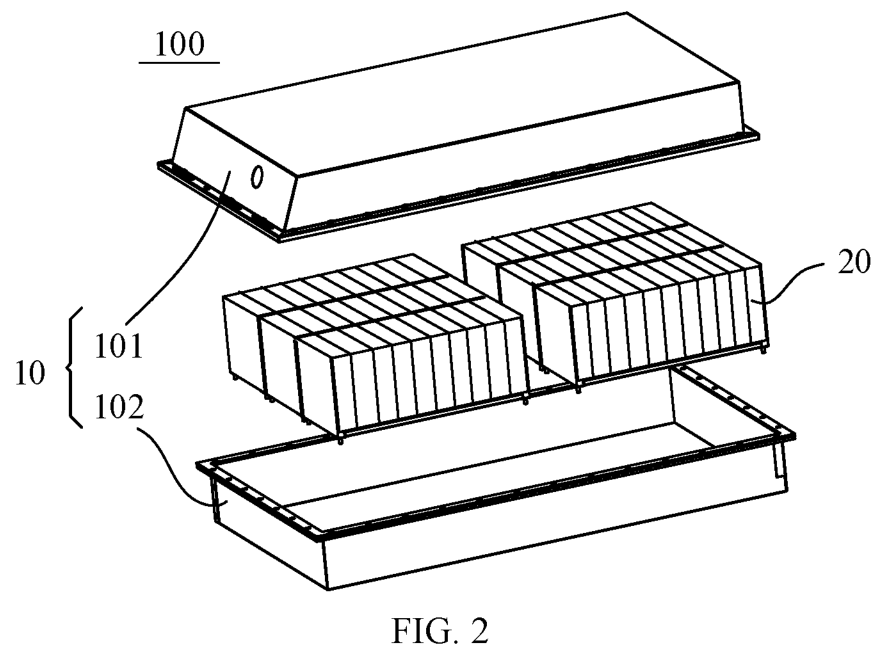
FIG. 2 is a schematic structural diagram of a battery disclosed in some embodiments of the present application.

With reference to FIG. 2, FIG. 2 is an exploded view of a battery 100 provided in some embodiments of the present application. The battery 100 includes a box 10 and a battery cell 20, and the battery cell 20 is accommodated in the box 10. The box 10 is configured to provide an accommodating space for the battery cell 20, and the box 10 may be a variety of structures. In some embodiments, the box 10 may include a first cover body 101 and a second cover body 102, the first cover body 101 covers the second cover body 102 and vice versa, the first cover body 101 and the second cover body 102 jointly define an accommodating space for accommodating the battery cell 20. The second cover body 102 may be a hollow structure with one end open, the first cover body 101 may be a plate-like structure, and the first cover body 101 covers the opening side of the second cover body 102 to allow the first cover body 101 and the second cover body 102 to jointly define the accommodating space; or both the first cover body 101 and the second cover body 102 may be hollow structures with one side open, and the opening side of the first cover body 101 covers the opening side of the second cover body 102. Certainly, the box 10 formed by the first cover body 101 and the second cover body 102 may be in various shapes, such as a cylinder, a cuboid.

In the battery 100, a plurality of battery cells 20 may be provided. The plurality of battery cells 20 may be in series connection, parallel connection or series-parallel connection, and the series-parallel connection means that the plurality of battery cells 20 are connected in series and parallel. The plurality of battery cells 20 may be in direct series connection, parallel connection or series-parallel connection, and then the whole body composed of the plurality of battery cells 20 is accommodated in the box 10. Certainly, the battery 100 may be in a form of battery module composed of the plurality of battery cells 20 first in series connection, parallel connection or series-parallel connection, and multiple battery modules are then in series connection, parallel connection or series-parallel connection to form a whole body, which is accommodated in the box 10. The battery 100 may further include another structure. For example, the battery 100 may further includes a bus component configured to implement electrical connection between the plurality of battery cells 20.

The battery cell 20 may include a lithium-ion secondary battery, a lithium-ion primary battery, a lithium-sulfur battery, a sodium/lithium-ion battery, a sodium-ion battery, a magnesium-ion battery, or the like, which is not limited in the embodiments of the present application. The battery cell may be cylindrical, flat, cuboid or in another shape, which is also not limited in the embodiments of the present application. The battery cell is generally divided into three types according to the way of packaging: a cylindrical battery cell, a prismatic battery cell and a pouch battery cell, which is also not limited in the embodiments of the present application.

Figure 3:
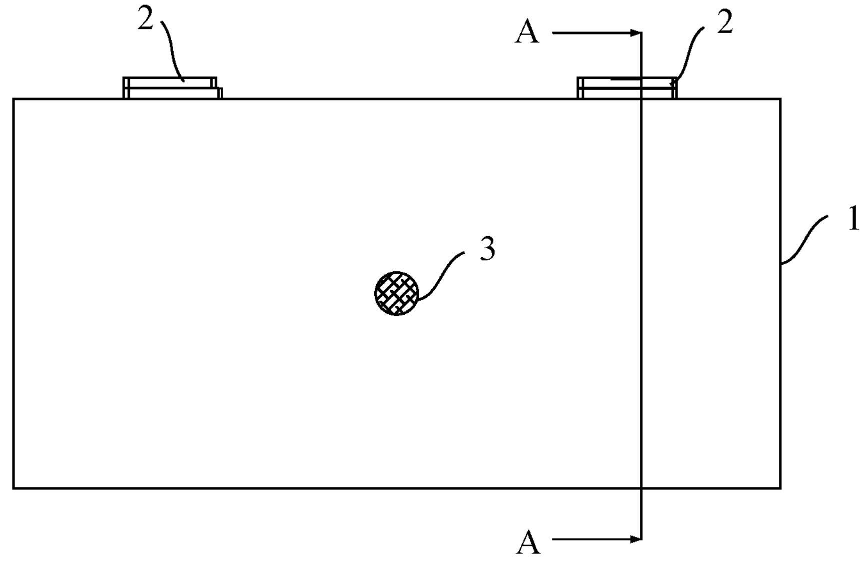
FIG. 3 is a schematic structural diagram of a battery cell disclosed in some embodiments of the present application.
Figure 4:
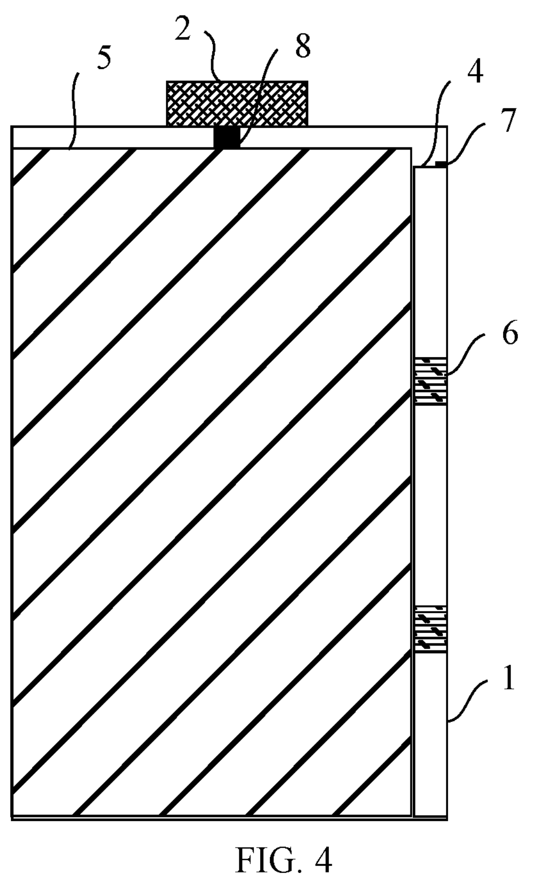
FIG. 4 is a cross-sectional view of a section along A-A in FIG. 3.

With reference to FIG. 3 and FIG. 4, FIG. 3 is a schematic structural diagram of a battery cell 20 provided in some embodiments of the present application, and FIG. 4 is a cross-sectional view of a section along A-A in FIG. 3. The battery cell 20 refers to the smallest unit for constituting the battery. As shown in FIG. 3, the battery cell 20 includes a housing 1, and two terminals 2 are disposed on the top of the housing 1. As shown in FIG. 4, the battery cell 20 further includes an electrode assembly and other functional components.

The housing 1 is a component configured to provide an accommodating space for accommodating the electrode assembly, an electrolytic solution, and other components therein. The housing 1 includes an accommodating body with an opening and an end cover for closing the opening. The accommodating body and the end cover may be independent components, the opening is provided on the accommodating body, and the end cover covers the opening at the opening to form the internal environment of the battery cell 20. Unlimitedly, the end cover and the accommodating body may be integrated. Specifically, the end cover and the accommodating body may form a common connecting face first before other components are placed in the housing, and when the interior of the accommodating body is required to be packaged, the end cover then covers the accommodating body. The accommodating body may be in various shapes and sizes, such as a cuboid, a cylinder, a hexagonal prism. Specifically, the shape of the accommodating body may be determined according to the specific shape and size of the electrode assembly. The material of the accommodating body may be various, for example, copper, iron, aluminum, stainless steel, aluminum alloy, plastic, which is not specially limited in the embodiments of the present application.

The accommodating body is an assembly configured to fit the end cover to form the internal environment of the battery cell 20, and the end cover is a component that covers the opening of the accommodating body to isolate the internal environment of the battery cell 20 from the external environment. Unlimitedly, the shape of the end cover may adapt to the shape of the accommodating body to fit the accommodating body. Optionally, the end cover may be made of a material with a certain hardness and strength, and in this way, the end cover does not easily deform when it is squeezed and expands, so that the structural strength of the battery cell 20 is higher, and the safety performance can be improved. The terminals 2 and other components may be disposed on the end cover. The terminals 2 may be configured to be electrically connected with the electrode assembly for outputting or inputting electric energy of the battery cell 20. In some embodiments, a pressure relief mechanism may be further disposed on the end cover, the pressure relief mechanism being configured to relieve an internal pressure when the internal pressure or temperature of the battery cell 20 reaches a threshold. The material of the end cover may be various, for example, copper, iron, aluminum, stainless steel, aluminum alloy, plastic, which is not specially limited in the embodiments of the present application. In some embodiments, an inner side of the end cover may further be provided with an insulating member, and the insulating member may be configured to isolate electrical connection components in the accommodating body from the end cover to reduce the risk of a short circuit. Exemplarily, the material of the insulating member may be plastic, rubber or the like.

The electrode assembly is a component in the battery cell 20 that undergoes an electrochemical reaction. The housing 1 may contain one or more electrode assemblies. The electrode assembly is mainly formed by winding or stacking a positive electrode sheet and a negative electrode sheet, and a separator is usually disposed between the positive electrode sheet and the negative electrode sheet. The electronic assembly includes a battery core 5 and two tabs 8 extending from the battery core 5. Parts of the positive electrode sheet and the negative electrode sheet that have active materials constitute the battery core 5 of the electrode assembly, and parts of the positive electrode sheet and the negative electrode sheet that do not have the active materials respectively constitute the two tabs 8 of the electrode assembly. A positive tab and a negative tab may be located at one end of the battery core 5 together or at two ends of the battery core 5, respectively. During the charging and discharging of the battery, the positive active material and the negative active material react with the electrolytic solution, and the tabs 8 are connected to the terminals 2 to form a current loop. The electrode assembly may be a winding structure or a laminated structure, and the embodiments of the present application are not limited thereto.

According to some embodiments of the present application, with reference to FIG. 3, and with further reference to FIG. 4, FIG. 4 is a cross-sectional view of a section along A-A in FIG. 3. The present application provides a battery cell 20. The battery cell 20 includes a housing 1, a protective member 4, a battery core 5, an elastic member 6, a first gas-permeable component 7 and a second gas-permeable component 3.

The protective member 4 is mounted on an inner wall of the housing 1 and separates an inner space of the housing 1 into a first chamber and a second chamber; the battery core 5 is disposed in the first chamber; and the elastic member 6 is disposed in the second chamber and located between the housing 1 and the protective member 4, and the protective member 4 is configured such that the elastic member 6 is compressed with expansion of the battery core 5 and stretches with contraction of the battery core 5.

The housing 1 is basically closed, and the interior of the housing 1 has a storage space, and the protective member 4, the battery core 5 and other components are disposed in the interior of the housing 1. The housing 1 may be cylindrical, cuboid or in another shape.

The protective member 4 is mounted on the inner wall of the housing 1, and the inner space of the housing 1 can be separated into two chambers through the protective member 4, so as to isolate the battery core 5 from the elastic member 6. The battery core 5 is located in the first chamber, and the elastic member 6 is located in the second chamber and between the housing 1 and the protective member 4.

By providing the protective member 4, the battery core 5 can be effectively isolated from the elastic member 6, which can protect the battery core 5 and prevent damage to the battery core 5 due to the squeeze between the elastic member 6 and the battery core 5, and can effectively protect the elastic member 6 and avoid the electrolytic solution in the battery core 5 to corrode the elastic member 6.

The protective member 4 is configured such that the elastic member 6 is compressed with expansion of the battery core 5 and stretches with contraction of the battery core 5, and the proactive member 4 may deform with stretch and compression of the elastic member 6. When the volume of the battery core 5 expands, the elastic member 6 is compressed; and when the volume of the battery core 5 contracts, the elastic member 6 stretches and recovers to a natural state. During the deformation of the elastic member 6, the protective member 4 also deforms with the stretch and compression of the elastic member 6, so that the elastic member 6 can be compressed or stretch.

By providing the elastic member 6, the swelling stress of the battery core 5 can be absorbed, which prevents a sudden change of the overall volume of the battery cell 20 due to the expansion of the battery core 5, avoids the reduction of the porosity of the electrode sheets caused by the squeezing of the electrode sheet with a force, affects the infiltration of the electrolytic solution on the electrode sheets, further avoids the breakage of the electrode sheets due to a large squeezing force for a long time and occurrence of the risk of a short circuit in the battery, and the like.

The first gas-permeable component 7 is mounted on the protective member 4, and the first gas-permeable component 7 is configured for one-way communication between the first chamber and the second chamber to enable gas in the first chamber to enter the second chamber through the first gas-permeable component 7. The second gas-permeable component 3 is mounted on the housing 1, and the second gas-permeable component 3 is configured for one-way communication between the second chamber and an outer space of the housing 1 to enable gas in the second chamber to be discharged out of the housing 1 through the second gas-permeable component 3.

During the use of the battery cell 20, the battery core 5 may generate gas to gradually increase the pressure in the first chamber, and at this time, the gas in the first chamber can be discharged in time through the first gas-permeable component 7, which prevents the gas from affecting the infiltration of the electrolytic solution in the battery core 5 on the electrode sheets, so as not to reduce the performance of the battery. The gas enters the second chamber through the first gas-permeable component 7, and when the pressure in the second chamber is greater than the gas pressure outside the housing 1, the gas in the second chamber may be discharged to the outside of the housing 1 through the second gas-permeable component 3, which prevents the gas from staying inside the housing 1.

Both the first gas-permeable component 7 and the second gas-permeable component 3 are components for one-way communication, and the gas can enter the second chamber from the first chamber through the first gas-permeable component 7, but cannot enter the first chamber from the second chamber through the first gas-permeable component 7, which can thus avoid the reverse delivery of the gas to the first chamber when the gas pressure in the second chamber is high, so as not to affect the performance of the battery core 5. Similarly, the gas can be discharged to the outside of the housing 1 from the second chamber through the second gas-permeable component 3, but the gas outside the housing 1 cannot enter the second chamber from the outer space of the housing 1 through the second gas-permeable component 3, which prevents the external gas from entering the second chamber through the second gas-permeable component 3, so as not to affect the pressure in the housing 1.

The embodiments of the battery cell provided in the present application can not only meet the need of alleviating a change of the volume of the battery cell, but also absorb the swelling stress of the battery cell when the battery cell is charged and expands, and maintain the tight interface contact between the positive electrode sheet and the negative electrode sheet when the battery is discharged, so as to build a breathing battery working mode; and due to the existence of the first gas-permeable component and the second gas-permeable component, when the battery cell generates gas, the generated gas may be discharged to the outside of the battery cell in real time, thereby ensuring the stability of the performance of the battery cell.

Moreover, in the embodiments of the present application, the arrangement of the elastic member 6 and the first gas-permeable component 7 and the second gas-permeable component 3 is not independent of each other, but interrelated. The inventor has found through research that, in the related art, some elastic members are disposed in the battery core, which may increase the difficulty of manufacturing the battery core and cause unstable quality of the battery core. In order to overcome these problems, the inventor has improved the arranged location of the elastic member 6. In the embodiments of the present application, the battery core 5 is disposed in the first chamber, and the elastic member 6 is disposed in the second chamber. Therefore, the elastic member 6 is located outside the battery core 5, the arrangement of the elastic member 6 does not affect the manufacture of the battery core 5, the battery core 5 may be manufactured separately according to a preset method, and the elastic member 6 may be disposed outside the various types of the battery core 5. Based on the arranged location of the elastic member 6, the inventor has further researched and found that there are at least two problems to be solved. One problem is that, in the related art, an gas-permeable component is usually disposed on the end cover of the housing 1, but other components such as terminals 2 and an exposure-proof valve are further dispose on the end cover. Therefore, the remaining space on the end cover is limited, the arrangement of the gas-permeable component on the end cover may be limited by space, and it is also necessary to consider interference with other components such as the terminals 2 and the exposure-proof valve. The second problem is that, in the embodiments of the present application, the protective member 4 separates the inner space of the housing 1 into two relatively independent chambers; the gas generated in the battery core 5 during working may increase the internal pressure of the first chamber; with stretch and compression of the elastic member 6, the internal pressure of the second chamber may change; therefore, in addition to discharging the gas in the first chamber in time, the pressure in the second chamber is required to be adjusted. Therefore, based on these considerations, the inventor has designed two gas-permeable components, the first gas-permeable component 7 is disposed on the protective component 4 for one-way communication between the first chamber and the second chamber, and the second gas-permeable component 3 is disposed on the housing 1 for one-way communication between the second chamber and the outer space of the housing 1. In this way, the gas in the first chamber can be discharged in time, and the pressure in the second chamber can be adjusted. In comparison with the technical solution of disposing two gas-permeable components on the housing, according to the technical solutions of the embodiments of the present application, the number of openings on the housing 1 can be reduced, and the first chamber, the second chamber and the outer space of the housing 1 can be in one-way communication to allow the gas to be discharged gradually with expansion of the battery core 5 and stretch and compression of the elastic member 6, forming a structure that realizes integrity and cooperation of absorption of the swelling stress of the battery core and discharging of the gas.

In some embodiments of the present application, the protective member 4 is connected to a side wall of the housing 1, and in this way, the elastic member 6 may be disposed on one side of the battery core 5 along the expansion direction of the battery core 5, so that the elastic member 6 deforms with expansion and contraction of the battery core 5. Another advantage of this arrangement is that, the second gas-permeable component 3 may be disposed on a side face of the housing 1 instead of the end cover at the top of the housing 1, and in this way, the second gas-permeable component 3 does not need to share space with other components on the end cover, such as the terminals 2 and the exposure-proof valve, to facilitate the arrangement of the second gas-permeable component 3. Moreover, the second gas-permeable component 3 is disposed on the side face of the housing 1, so that the gas is not blocked by other components such as the terminals 2 and the explosion-proof valve when discharged, which is conducive to discharging the gas more smoothly.

In some embodiments of the present application, the protective member 4 is U-shaped, which is convenient to form a closed second chamber together with the inner wall of the housing 1, and chambers in the inner space of the housing 1 other than the second chamber constitute the first chamber.

According to some embodiments of the present application, the first gas-permeable component 7 includes a first one-way gas-permeable valve or a one-way gas-permeable membrane. The one-way gas-permeable valve has high structural strength and a long service life. The arrangement of the one-way gas-permeable membrane is relatively convenient, and does not occupy too much space. The one-way gas-permeable membrane may allow gas to pass through, and may isolate a liquid, which prevents the electrolytic solution in the first chamber from entering the second chamber.

The one-way gas-permeable membrane may be selected from existing finished products, such as a VAP one-way gas-permeable membrane, and the air-permeable membrane includes multiple layers of materials, which can allow gas to pass through but not a liquid, and can isolate the electrolytic solution to prevent the electrolytic solution from leaking through the gas-permeable membrane, so as not to reduce the waste of the electrolytic solution.

According to some embodiments of the present application, the second gas-permeable component 3 includes a second one-way gas-permeable valve. The second gas-permeable component is exposed on an outer surface of the housing 1, the second gas-permeable component adopts a gas-permeable valve, which has high structural strength, and the service life of the second gas-permeable component can be effectively improved.

According to some embodiments of the present application, the battery cell further includes an explosion-proof valve disposed on the housing 1, the first gas-permeable component 7 includes a first one-way gas-permeable valve, and an opening pressure of the first one-way gas-permeable valve and an opening pressure of the second one-way air permeable valve are both less than an opening pressure of the explosion-proof valve. This setting can allow the first one-way air permeable valve and the second one-way air permeable valve to be opened before the explosion-proof valve is opened, which prevents the explosion-proof valve from being detonated before opening the first one-way air permeable valve and the second one-way air permeable valve, so as not to cause the housing 1 to relieve the pressure in advance.

Figure 5:
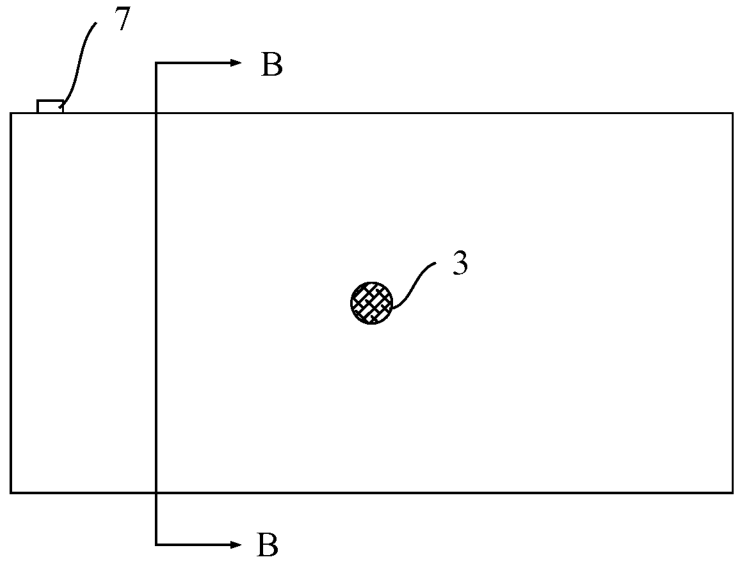
FIG. 5 is a main view of a structural member consisting of a protective member and a housing in a battery cell disclosed in some embodiments of the present application.
Figure 6:
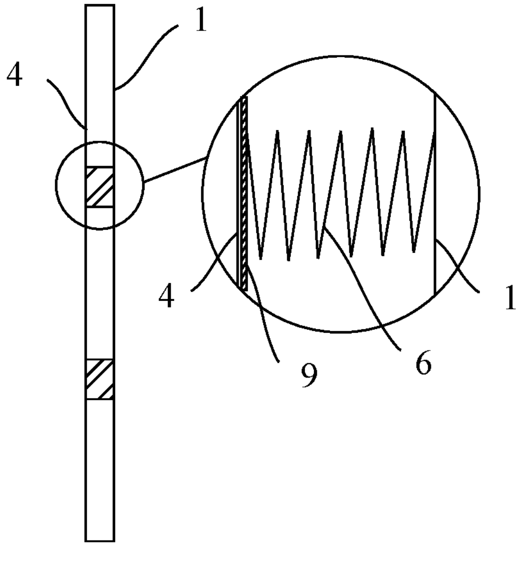
FIG. 6 is a cross-sectional view of a section along B-B in FIG. 5.

According to some embodiments of the present application, with reference to FIG. 5 and FIG. 6, FIG. 5 is a main view of a structural member consisting of a protective member and a housing of a battery cell disclosed in some embodiments of the present application, and FIG. 6 is a cross-sectional view of a section along B-B in FIG. 5. The protective member 4 includes a flexible portion, and the flexible portion is capable of deforming with stretch and compression of the elastic member 6.

The flexible portion is a portion that is relatively soft and easily deforms with respect to other portions.

Through the deformation of the flexible portion, the protective member 4 may deform with stretch and compression of the elastic member 6, thereby allowing the elastic member 6 to be compressed with expansion of the battery core 5 or to recover to its original shape with contraction of the battery core 5.

A material of the flexible portion may include at least one of nitrile rubber, silicon rubber, fluororesin and polypropylene. The texture of the flexible portion is relatively soft and easily deforms, so as to achieve the purpose of deformation with stretch and compression of the elastic member 6. Meanwhile, the flexible portion has an isolation effect, which can effectively protect the battery core 5 from direct contact with the elastic member 6 and prevent the battery core 5 from being damaged due to the squeeze of the elastic member 6, and can effectively protect the elastic member 6 and prevent the elastic member 6 from being corroded by the electrolytic solution.

The flexible portion may be a part of the protective member 4, that is, a part of the protective member 4 is flexible while the other part is rigid, which can improve the overall hardness of the protective member 4. The flexible portion may also be the entirety of the protective member 4, that is, the entirety of the protective member 4 is flexible and has a better deformation ability.

As shown in FIG. 6, according to some embodiments of the present application, the battery cell further includes a baffle 9 disposed in the second chamber, the baffle 9 is disposed on an inner side of the flexible portion, and the elastic member 6 is disposed between the baffle 9 and the housing 1.

By providing the baffle 9 and disposing the elastic member 6 between the baffle 9 and the housing 1, the generation of a large squeezing force by the elastic member 6 on the electrode sheets in the battery core 5 can be avoided so as not to cause the damage to the electrode sheets. By providing the baffle 9, the direct contact between the elastic member 6 and the flexible portion can also be avoided, the sharp end of the elastic member 6 prevented from puncturing the flexible portion, the flexible portion effectively protected, and the service life of the protective member 4 improved.

The baffle 9 may be a flat-plate structure, or in another structural shape such as a main body.

According to some embodiments of the present application, a material of the baffle 9 includes terylene resin. This material can meet the hardness requirement, and the cost is relatively low.

According to some other embodiments of the present application, the protective member 4 includes a protective portion and a telescopic portion coupled between the protective portion and the housing 1, the elastic member 6 is disposed between the protective portion and the housing 1, and the telescopic portion lengthens or shortens under an action of the elastic member 6.

The telescopic portion is a portion that is extensible and can shorten. Through the extension or shortening of the telescopic portion, the purpose of deformation of the protective member 4 with stretch and compression of the elastic member 6 can be realized, so that the elastic member 6 may deform with the expansion or contraction of the battery core 5.

The elastic member 6 is disposed between the protective portion and the housing 1, which can avoid the contact between the elastic member 6 and the telescopic portion, and prevent the elastic member 6 from affecting stretch and compression of the telescopic portion, so as not to interfere with the stretch and compression of the telescopic portion.

According to some embodiments of the present application, the telescopic portion includes a telescopic ripple-like connecting portion. The ripple-like connecting portion has an ability to lengthen or shorten, such as a bellows. When multiple segments of the bellows are superposed together, the length of the bellows shortens; and when multiple segments of the bellows are relatively unfolded, the length of the bellows lengthens. The ripple-like connecting portion includes a plurality of superimposable connecting segments. When the plurality of connecting segments are superposed together, the overall length of the cripple-like connecting portion shortens; and when the plurality of connecting segments are relatively unfolded, the overall length of the ripple-like connecting portion lengthens.

According to some embodiments of the present application, the elastic member 6 includes a spring, and a length of the spring ranges from 2 mm to 10 mm. If the spring is too long, the length of the housing 1 will be increased, and the area occupied by the battery cell will be increased. If the spring is too short, it is possible to affect the stretch and compression ability of the spring and reduce the ability to alleviate the expansion of the battery core.

In addition to the spring, the elastic member 6 may adopt elastics such as rubber.

Figure 7:
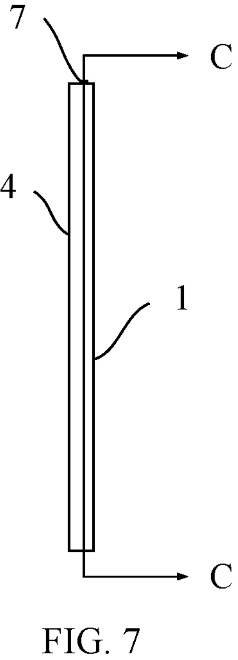
FIG. 7 is a side view of a structural member consisting of a protective member and a housing in a battery cell disclosed in some embodiments of the present application.
Figure 8:
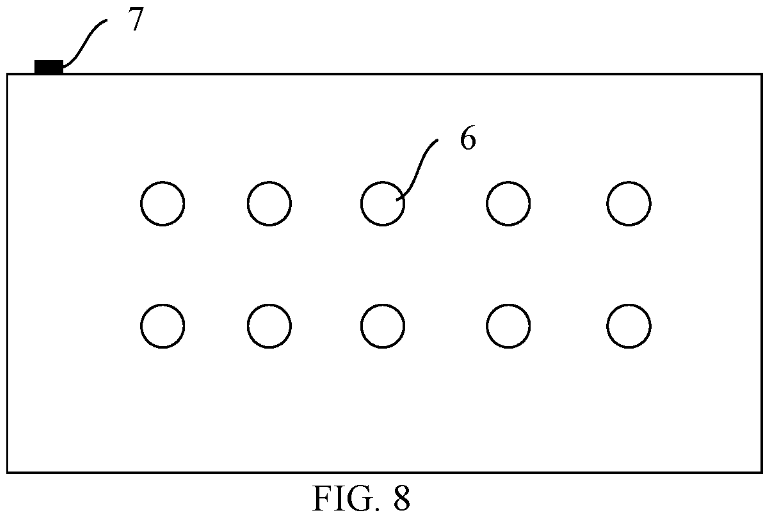
FIG. 8 is a cross-sectional view of a section along C-C in FIG. 7.

According to some embodiments of the present application, with reference to FIG. 7 and FIG. 8, FIG. 7 is a side view of a structural member consisting of a protective member and a housing in a battery cell disclosed in some embodiments of the present application, and FIG. 8 is a cross-sectional view of a section along C-C in FIG. 7. The battery cell includes a plurality of elastic members 6, and the plurality of elastic members 6 are evenly arranged in the second chamber in multiple rows.

By providing the plurality of elastic members 6, the ability to support the battery core 5 can be improved, and the plurality of elastic members 6 are evenly distributed, which can provide even support for the battery core 5 and prevent the battery core 5 from being partially squeezed and damaged.

According to some embodiments of the present application, the present application further provides a battery, which includes the battery cell according to any one of the above solutions.

According to some embodiments of the present application, the present application further provides a power consumption device, which includes the battery according to any one of the above solutions, and the battery is configured to provide electric energy for the power consumption device.

The power consumption device may be any one of the aforementioned devices or systems using batteries.

The present application further provides a manufacturing method for a battery cell, and the method includes:

- providing a housing 1;
- mounting a protective member 4 on an inner wall of the housing 1, the protective member 4 separating an inner space of the housing 1 into a first chamber and a second chamber;
- disposing a battery core 5 in the first chamber;
- disposing an elastic member 6 in the second chamber, the elastic member 6 being located between the housing 1 and the protective member 4, and the protective member 4 being configured such that the elastic member 6 is compressed with expansion of the battery core 5 and stretches with contraction of the battery core 5;
- mounting a first gas-permeable component 7 on the protective member 4, the first gas-permeable component 4 being configured for one-way communication between the first chamber and the second chamber to enable gas in the first chamber to enter the second chamber; and
- mounting a second gas-permeable component 3 on the housing 1, the second gas-permeable component 3 being configured for one-way communication between the second chamber and an outer space of the housing 1 to enable gas in the second chamber to be discharged out of the housing 1.

The positive effects of the various embodiments of the battery cell of the present application are also applicable to a battery, a power consumption device and a manufacturing method for a battery cell, which will not be repeated here in detail.

According to some embodiments of the present application, with reference to FIG. 3 to FIG. 8, the present application provides a prismatic battery cell, and the battery cell includes a housing 1, terminals 2, a second air-permeable component 3, a protective member 4, a battery core 5, an elastic member 6, a first air-permeable component 7, tabs 8 and a baffle 9.

The housing 1 includes an accommodating body with an opening at the top and an end cover for closing the opening of the accommodating body. Two terminals 2 are disposed on the end cover at the top of the housing 1. The battery core 5 includes a negative electrode sheet connected to a negative tab, a positive electrode sheet connected to a positive tab, a separator separating the positive electrode sheet and the negative electrode sheet, and an electrolytic solution for conducting lithium ions. In an example of the direction shown in FIG. 4, the protective member 4 is mounted on a right inner wall of the housing 1 to separate an inner space of the housing 1 into a first chamber and a second chamber, and the first chamber is located to the left of the second chamber. The battery core 5, the tabs 8 and other components are disposed in the first chamber, and the elastic member 6 is disposed in the second chamber. The baffle 9 is mounted on a wall face of the protective member 4 located inside the second chamber, one end of the elastic member 6 abuts against the baffle 9, and the other end abuts against an inner wall of the housing 1. The baffle 9 may adopt a hard plastic flat plate with a thickness of 1 mm, a width of 46 mm, and a length of 80 mm. The whole protective member 4 is made of a flexible material, such as nitrile rubber, silicon rubber, fluororesin or polypropylene. Two rows of elastic elements 6 are arranged in the second chamber, each row includes 5 elastic members 6, and the space between two adjacent elastic elements 6 in each row is equal. The first gas-permeable component 7 is mounted on the top of the protective member 4 and configured for one-way communication between the first chamber and the second chamber. The second gas-permeable component 3 is disposed at the center of a right side face of the housing 1 and configured for one-way communication between the second chamber and an outer space of the housing 1. The two tabs 8 respectively extend from the top of the battery core 5, and the two tabs 8 are electrically connected to the two terminals 2, respectively.

When the battery core 5 expands, the battery core 5 squeezes the elastic member 6 to compress the elastic member 6, and the elastic member 6 absorbs the change of the volume caused by the expansion of the battery core 5, which prevents a sudden change in the overall volume of the battery cell. When the battery core 5 contracts, the deformation of the elastic member 6 recovers, which can maintain the stability of the battery core 5 in the housing 1. Meanwhile, during the expansion or other periods of working, if gas is generated inside the battery core 5, the gas can enter the second chamber from the first chamber through the first gas-permeable component 7 at any time, and be discharged to the outside of the housing 1 from the second chamber through the second air-permeable component 3, so as to avoid the gas to affect interfaces of the electrode sheets in the battery core 5 and the infiltration of the electrolytic solution to the electrode sheets and reduce the performance of the battery.

In some embodiments of the present application, the elastic member 6 includes a compressible spring, and the deformation range of the compressible spring is 5% to 60% of the total length of the spring in the natural state. This deformation range is relatively wide and can satisfy the change of the swelling stress in the whole life cycle of the battery cell. The strength of the compressible spring ranges from 0.2 Mpa to 2.6 Mpa, and the maximum strength of the compressible spring is less than the swelling stress inside the battery, so that the spring can absorb the swelling stress of the battery for building a breathing battery working mode and maintaining the interface contact inside the battery. Moreover, the strength of the compressible spring is always less than the rupture strength of the housing 1 by 3 Mpa, as shown in Table 1 below, which shows the corresponding relationship between the deformation and strength of the compressible spring.

TABLE 1

Corresponding relationship between deformation and strength of a compressible spring:

| | Compressive deformation | | | | | | | | | | | |
|---|---|---|---|---|---|---|---|---|---|---|---|---|
| | 5% | 10% | 15% | 20% | 25% | 30% | 35% | 40% | 45% | 50% | 55% | 60% |
| Compressive strength/Mpa | σ5 0.21 | σ10 0.43 | σ15 0.65 | σ20 0.87 | σ25 1.09 | σ30 1.30 | σ35 1.52 | σ40 1.74 | σ45 1.96 | σ50 2.17 | σ55 2.39 | σ60 2.60 |

In addition, the first gas-permeable component 7 may adopt a first one-way gas-permeable valve, and the second gas-permeable component 3 may adopt a second one-way gas-permeable valve. The opening condition of the first one-way gas-permeable valve and the second one-way gas-permeable valve is that the internal air pressure of the battery cell reaches 0.03~0.05 Mpa, and an opening pressures of the first one-way gas-permeable valve and the second one-way gas-permeable valve are always less than a valve opening pressure of the explosion-proof valve disposed on the end cover at the top of the housing 1 by 0.9±0.2 Mpa.

Although the present application has been described with reference to the preferred embodiments thereof, various modifications can be made thereto without departing from the scope of the present application, and the components therein can be replaced with equivalents. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery cell, comprising:

a housing;

a protective member mounted on an inner wall of the housing and separating an inner space of the housing into a first chamber and a second chamber;

a battery core disposed in the first chamber;

an elastic member disposed in the second chamber and located between the housing and the protective member, the protective member being configured such that the elastic member is compressed with expansion of the battery core and stretches with contraction of the battery core;

a first gas-permeable component mounted on the protective member and configured for one-way communication between the first chamber and the second chamber to enable gas in the first chamber to enter the second chamber through the first gas-permeable component; and a second gas-permeable component mounted on the housing and configured for one-way communication between the second chamber and an outer space of the housing to enable gas in the second chamber to be discharged out of the housing through the second gas-permeable component.

2. The battery cell according to claim 1, wherein the protective member comprises a flexible portion, and the flexible portion is capable of deforming with stretch and compression of the elastic member.

3. The battery cell according to claim 2, wherein a material of the flexible portion comprises at least one of nitrile rubber, silicon rubber, fluororesin and polypropylene.

4. The battery cell according to claim 2, further comprising a baffle disposed in the second chamber, the baffle being disposed on an inner side of the flexible portion, and the elastic member being disposed between the baffle and the housing.

5. The battery cell according to claim 4, wherein a material of the baffle comprises terylene resin.

6. The battery cell according to claim 1, wherein the protective member comprises a first protective portion and a telescopic portion coupled between the first protective portion and the housing, the elastic member is disposed between the first protective portion and the housing, and the telescopic portion lengthens or shortens under an action of the elastic member.

7. The battery cell according to claim 6, wherein the telescopic portion comprises a telescopic ripple-like connecting portion.

8. The battery cell according to claim 1, wherein the elastic member comprises a spring, and a length of the spring ranges from 2 mm to 10 mm.

9. The battery cell according to claim 1, wherein the battery cell comprises a plurality of elastic members, and the plurality of elastic members are evenly arranged in the second chamber in multiple rows.

10. The battery cell according to claim 1, wherein the first gas-permeable component comprises a first one-way gas-permeable valve or a one-way gas-permeable membrane.

11. The battery cell according to claim 1, wherein the second gas-permeable component comprises a second one-way gas-permeable valve.

12. The battery cell according to claim 11, further comprising an explosion-proof valve disposed on the housing, the first gas-permeable component comprising a first one-way gas-permeable valve, and an opening pressure of the first one-way gas-permeable valve and an opening pressure of the second one-way air permeable valve are both less than an opening pressure of the explosion-proof valve.

13. A battery, comprising the battery cell according to claim 1.

14. A power consumption device, comprising the battery according to claim 13, the battery being configured to supply electric energy for the power consumption device.

15. A manufacturing method for a battery cell, comprising:

providing a housing;

mounting a protective member on an inner wall of the housing, the protective member separating an inner space of the housing into a first chamber and a second chamber;

disposing a battery core in the first chamber;

disposing an elastic member in the second chamber, the elastic member being located between the housing and the protective member, the protective member being configured such that the elastic member is compressed with expansion of the battery core and stretches with contraction of the battery core;

mounting a first gas-permeable component on the protective member, the first gas-permeable component being configured for one-way communication between the first chamber and the second chamber to enable gas in the first chamber to enter the second chamber; and mounting a second gas-permeable component on the housing, the second gas-permeable component being configured for one-way communication between the second chamber and an outer space of the housing to enable gas in the second chamber to be discharged out of the housing.

* * * * *